United States Patent [19]

Ishida et al.

[11] Patent Number: 5,840,197

[45] Date of Patent: Nov. 24, 1998

[54] METHOD FOR FILTERING A SCREEN CHANGER AND A SCREEN CHANGER

[75] Inventors: Yasuhiko Ishida; Hideki Mizuguchi, both of Hiroshima, Japan

[73] Assignee: The Japan Steel Works, Ltd., Tokyo, Japan

[21] Appl. No.: 634,843

[22] Filed: Apr. 19, 1996

[30] Foreign Application Priority Data

Apr. 19, 1995 [JP] Japan ..................................... 7-093784

[51] Int. Cl.⁶ .............................. B01D 37/00; D01D 1/10; B29C 47/68
[52] U.S. Cl. ......................... 210/780; 210/790; 210/359; 210/447; 210/433.1; 425/199; 264/169
[58] Field of Search .................................... 425/197, 198, 425/199; 264/169; 210/780, 790, 359, 447, 433.1

[56] References Cited

U.S. PATENT DOCUMENTS

| 3,675,934 | 7/1972 | Heston ..................................... 425/199 |
| 3,962,092 | 6/1976 | Newman, Jr. ........................... 425/199 |
| 4,167,384 | 9/1979 | Shirato et al. .......................... 425/199 |
| 4,507,072 | 3/1985 | Gaul, Jr. .................................. 425/199 |
| 4,752,386 | 6/1988 | Schulz et al. ........................... 425/199 |
| 5,578,206 | 11/1996 | Ogoshi et al. .......................... 425/199 |
| 5,603,828 | 2/1997 | Ishida et al. ............................ 425/199 |

*Primary Examiner*—Robert J. Popovics
*Attorney, Agent, or Firm*—Sughrue, Mion, Zinn, Macpeak & Seas, PLLC

[57] ABSTRACT

The screen changer of the invention is structured such that a material discharge passage formed in a housing is brought into communication with the in-flow passage of a through passage formed in the housing through the upstream chambers of through passage portions respectively formed in slide bars, and the molten materials that have passed through the in-flow passage in the initial operation of the extruding machine are discharged into the above material discharge passage, thereby being able to remove the mixtures remaining in the extruding machine prior to the normal operation of the extruding machine.

2 Claims, 7 Drawing Sheets

METHOD FOR FILTERING A SCREEN CHANGER AND A SCREEN CHANGER

BACKGROUND OF THE INVENTION

1. Field of the invention

The present invention relates to a screen changer filtering method and a screen changer for use with an extruding machine which kneads, melts and extrudes resin materials and, in particular, to a new improvement in such a screen changer filtering method and screen changer, in which, in the initial stage of the operation of the extruding machine, molten materials containing a large quantity of impurities remaining within the extruding machine can be discharged out of the extruding machine system without passing through a filtering part.

2. Related art

Generally, in resin materials which are molten, kneaded and extruded by an extruding machine, in most cases, there are mixed and contained solid bodies such as refuse and the like which will not melt. In order to remove such mixed solid bodies or mixtures, the extruding machine includes a filtering device. In the filtering device, a screen is disposed in the molten material passage of the extruding machine, the mixed solid bodies are screened or filtered by the screen, and the filtered pure molten materials are then supplied to a next device such as a die or the like. However, as the filtering time passes by, the mixtures (filtered bodies) accumulate on the surface of the screen on the upstream side thereof, and the accumulation of the mixtures decreases the filtering area of the screen to thereby increase the flow resistance of the molten materials, which results in the lowered operational efficiency of the extruding machine. For this reason, the screen must be cleaned to thereby remove the accumulated mixtures, or must be replaced with a new screen periodically or as the need arises.

As a conventional structure of a screen changer of this kind, generally, there are known a first conventional structure which is shown in FIGS. 7 to 9, and a second conventional structure which is shown in FIG. 10.

At first, referring to the first conventional structure shown in FIGS. 7 to 9, in FIG. 7, reference character 1 designates a screen changer. The screen changer 1 comprises a housing 2 having two parallel through holes 23, 24 each of which has a circular section taken along the direction at right angles to the axis thereof, two pillar-shaped slide bars 3, 4 respectively inserted into the through holes 23, 24 in such a manner that they are liquid tight and can be reciprocated, and two oil cylinders 5, 6 which are respectively fixed to the housing 2 through a plurality of tie bars 8, nuts 8a and mounting plates 7 and also which include piston rods 5a, 6a respectively connected to the slide bars 3, 4.

In FIG. 8, in the housing 2, there is formed a through passage 11 which extends in a direction at right angles to the through holes 23, 24. The through passage 11, on the entrance side IN thereof, is formed as an in-flow passage 11A which branches into an upper in-flow passage 11a and a lower in-flow passage 11b. On the other hand, on the exit side OUT thereof, the through passage 11 branches into an upper out-flow passage 11c and a lower out-flow passage 11d which then converge into a out-flow passage 11B. The respective upper and lower passages 11a–11d intersect and communicate with the two through holes 23, 24.

Also, in the respective slide bars 3, 4, there are formed through passage portions 100, 101 which respectively communicate with the through passage 11 and extend through the through passage 11 in a direction at right angles to the respective axes of the slide bars 3, 4. And, the through passage portions 100, 101 are respectively composed of upstream chambers 31, 41, filtering portions 9, and downstream chambers 32, 42, while each of the filtering portions 9 is composed of a screen 9a and a breaker plate 10. The upstream chambers 31, 41 are respectively formed to have a large opening section in order that they can provide a large filtering area, that is, the screen 9a can provide a large plane area. The downstream chambers 32, 42 are respectively formed in such a manner that they have large opening sections in the rear of the breaker plates 10 but, after then, their opening sections are smoothly decreased in the downstream direction so as to be able to match the small opening sections of the upper outflow passage 11c and lower outflow passage 11d. Also, in the housing 2, there are formed the above-mentioned through holes 23, 24 which respectively have sufficient lengths to seal up the through passage portions 100, 101 when the slide bars 3, 4 are reciprocated.

In FIGS. 7 and 8, there are respectively shown a state in which the upper slide bar 3 is in a filtrable state, that is, the through passage 11 of the housing 2 is in communication with the filtering portion 9 of the upper slide bar 3, and a state in which the lower side bar 4 is in a screen 9a cleanable or replaceable state, that is, the filtering portion 9 of the lower slide bar 4 is exposed outside of the housing 2. When the operation of an extruding machine (not shown) is started, the screen changer 1 provided in the extruding machine is firstly disposed at the position of the upper driver 3 shown in FIG. 7, that is, in the filtrable state, where it filtrates the molten materials.

That is, the molten materials, which are extruded from the extruding machine, are diverged from the in-flow passage 11A of the housing 2, are moved into and filtered by the filtering portions 9 respectively provided in the two slide bars 3, 4, are then joined together in the out-flow passage 11B, and are finally discharged therefrom. If the extruding machine is operated continuously, then the filtered bodies specifically, the impurities contained in the molten materials and left on the surface of the screen 9a due to the filtering operation) are accumulated on the surface of the screen 9a on the upstream chambers 31, 41 side thereof to thereby increase the flow resistance of the screens 9a, which in turn lowers the operational efficiency of the extruding machine. For this reason, the flow resistance must be decreased by cleaning the screens 9a or by replacing them with new screens. In this case, to clean or replace the screen 9a without stopping the operation of the extruding machine, the filtering operation is temporarily carried out by only one of the screens 9a, while the other screen 9a is cleaned or replaced; and, after then, the filtering operation is temporarily carried out only by the other screen 9a, while the one screen 9a is cleaned or replaced.

As shown in FIG. 7, the slide bars 3, 4 including the screens 9a to be cleaned or replaced, are extruded from the state of the upper slide bar 3 to the state of the lower slide bar 4 by the oil pressure cylinders 5, 6, the screens 9a are then cleaned or replaced, and, after then, the slide bars 3, 4 are returned back to the state of the upper slide bar 3; and, this series of operations are sequentially enforced for each of the two slide bars 3, 4.

In the cleaning or replacing operation of the screens 9a, when the slide bars 3, 4 are pushed out, they are pushed out at a stroke and, on the other hand, when the slide bars 3, 4 are pulled back, as shown in FIG. 9, the slide bars 3, 4 are stopped once in a state in which the through passage portions 100, 101 of the slide bars 3, 4 are respectively sealed up within the through holes 23, 24, the through passage portions 100, 101 of the slide bars 3, 4 are respectively filled with the molten materials to thereby let the air out-of the through passage portions 100, 101, and, after then, the slide bars 3, 4 are returned back to their original filtrable states. The reason why these operations are performed in returning the slide bars back to their original filtrable states is as follows; that is, when the filtering portions 9 are exposed outside the housing 2 and the screens 9a are cleaned and replaced, if the molten materials loaded fully in the through passage portions 100, 101 of the slide bars 3, 4 are removed partly or fully so that the through passage portions 100, 101 are empty and the slide bars 3, 4 are returned back at a stroke to their filtrable states while they are empty, then the slide bars 3, 4 are extruded in such a manner the air existing in the empty portions of the through passage portions 100, 101 of the slide bars 3, 4 is mixed into the molten materials; and thus, when the molten materials mixed with the air are then discharged in a strand condition from the die, the air can be expanded suddenly to thereby cause the strand condition to be cut. In order to fill the through passage portions 100, 101 of the slide bars 3, 4 with the molten materials, in the slide bars 3, 4, there are formed grooves 3a, 4a which allow the through passage portions 100, 101 of the slide bars 3, 4 to communicate with the through passage 11 as well as grooves 3b, 4b, 3c, 4c which allow the through passage portions 100, 101 to communicate with the outside of the housing 2.

Also, in the second conventional structure shown in FIG. 10, in the central position of a through passage 11 of a cylindrical housing 2, there is provided a slide bar (slide plate) 3 which intersects the through passage 11 and can be slid in a direction of an arrow A in FIG. 10. The slide bar 3 includes two through passage portions 100 each including a filtering portion 9 which is composed of a breaker plate 10 and a screen 9a. The two through passage portions 100 are spaced apart from each other in the sliding direction of the slide bar 3 in such a manner that they are communicable with the housing 2. Also, the slide bar 3 further includes on the outside of the through passage portion 100 an L-shaped material discharge passage 50 which allows the inflow side of the through passage 11 of the housing 2 to communicate with the outside.

Further, the slide bar 3 is connected with a piston rod 5a of a cylinder 5 supported by a pair of tie bars 8 which are respectively provided in the housing 2. In the second conventional structure, the slide bar 3 is slid by means of the operation of the cylinder 5 to thereby be able to bring the respective through passage portions 100 and the material discharge passage 50 into communication with the through passage 11 selectively.

Therefore, if the molten materials are made to pass while the material discharge passage 50 is in communication with the through passage 11, then it is possible to discharge out the residuals (such as impurities and the like) that are left within the extruding machine in the beginning stage of the operation thereof. Next, in the normal operation of the extruding machine in which the molten materials are supplied to the die side for actual extrusion formation or molding, the cylinder 5 is used to allow the through passage portions 100 to communicate with the through passage 11 quickly.

Also, when the filtering portion 9 of one slide bar is cleaned or the screen 9a is replaced during the filtering operation, one of the through passage portions 100 is quickly switched over to the other through passage portion 100 held at a waiting state, while the one slide bar is pulled out externally of the housing 2 and the filtering portion 9 thereof is then cleaned or the screen 9a thereof is replaced.

Since the conventional screen changers are structured in the above-mentioned manner, there are left problems to be solved as follows.

Firstly, in the first conventional structure, it is difficult to filter the molten materials containing a large quantity of mixtures. That is, in the beginning stage of the operation of the extruding machine, the molten materials are pushed out in such a manner that they are mixed with the impurities (solid bodies) remaining in the interior portions of the extruding machine and thus, for a while, a large quantity of mixtures are pushed out. The large quantity of mixtures are accumulated very quickly on the surface of the screen on the upstream chamber side thereof, which makes it necessary to replace the screen with a new one frequently. However, in the first conventional structure, since there is necessary a step after the replacement of the screen, of sealing up the through passage portions within the through holes and filling the through passage portions with the molten materials, it takes time to replace the screen and thus it is very difficult to replace the screen quickly and frequently. Therefore, when the screen changer having the first conventional structure is used, in the upstream portion thereof, there is provided a diverter valve (a discharge device) which is used to discharge the molten materials externally. As a result of this, the whole length of the extruding machine including the screen changer and the like is extended by an amount corresponding to the length of the diverter valve.

Next, in the second conventional structure, although the molten materials containing a large quantity of mixtures can be discharged externally through the material discharge passage without being passed through the screen, since the screen is replaced quickly in the normal operation, the through passage portion cannot be filled with the molten materials so that the air cannot be discharged from the through passage portion. For this reason, the air remaining in the through passage portion just after the replacement of the screen mixes into the filtered molten materials and thus, when the extrusion molded product is pushed out from the die in the downstream portion, air bubbles can be produced in the extrusion molded product and the air bubbles can break, which causes a poor extrusion molded product (when it is formed into a strand, such break-up of the air bubbles causes the strand to cut). The poor extrusion molded product is produced each time the screen is replaced and, whenever the poor extrusion molded product is produced, not only the poor extrusion molded product must be eliminated but also a device for treating molded products must be re-adjusted in order to return the device to its normal operation. Further, in the second conventional structure, since the two through passage portions and one material discharge passage are arranged in a straight line in the axial direction of the slide bar, the screen changer is extended very long in a direction at a right angle to the axis of the extruding machine.

SUMMARY OF THE INVENTION

The present invention aims at eliminating the drawbacks found in the above-mentioned conventional structures. Accordingly, it is an object of the invention to provide a screen changer filtering method and a screen changer which can discharge molten materials containing a large quantity of mixtures externally without passing them through a screen and also which prevents the outer shape of the screen changer from being large in size.

In attaining the above object, according to the invention, there is provided a screen changer filtering method in which, by use of a housing and two pillar-shaped slide bars, the housing including a through passage and two through holes respectively intersecting the branch passages of the through passage branching off from the middle portion of the through passage, the two slide bars respectively including filtering portions communicatable with the through passage, the two slide bars being respectively inserted into the through holes of the housing in such a manner that they are liquid tight and can be reciprocated, molten materials from an extruding machine are guided to flow from an in-flow passage of the through passage of the housing through the filtering portions of the slide bars to an out-flow passage of the through passage of the housing, characterized in that the through passage portions of the slide bars and the through passage of the housing can be brought into communication with each other arbitrarily and selectively in any one of three conditions including a first condition in which the through passage portions of the two slide bars are respectively in communication with the branch passages of the housing at the same time, a second condition in which only the through passage portion of one of the slide bars is in communication with the through passage of the housing, and a third condition in which one of the slide bars brings an in-flow-passage branching off from the through passage of the housing into communication with a material discharge passage, allowing one of the through holes of the housing to communicate with the outside by means of the in-flow portion of the through passage portion thereof and, at the same time, the other slide bar shuts off the other branch passage of the housing through passage.

Also, according to another aspect of the invention, there is provided a screen changer filtering method in which, by use of a housing and two pillar-shaped slide bars, the housing including a through passage and two through holes respectively intersecting the branch passages of the through passage branching off from the middle portion of the through passage, the two slide bars respectively including filtering portions communicatable with the through passage, the two slide bars being respectively inserted into the through holes of the housing in such a manner that they are liquid tight and can be reciprocated, molten materials from an extruding machine are guided to flow from an in-flow passage of the through passage of the housing through the filtering portions of the slide bars to an out-flow passage of the through passage of the housing, characterized in that the through passage portions of the slide bars and the through passage of the housing can be brought into communication with each other arbitrarily and selectively in any one of three communication conditions including a first condition in which the through passage portions of the two slide bars are respectively in communication with the branch passages of the housing at the same time, a second condition in which only the through passage portion of one of the slide bars is in communication with the through passage of the housing, and a third condition in which the two slide bars bring the in-flow passage of the through passage of the housing into communication with the a material discharge passage allowing the through holes of the housing to communicate with the outside by means of the in-flow portions of the through passage portions thereof.

Further, according to still another aspect of the invention, there is provided a screen changer in which, by use of a housing and two pillar-shaped slide bars, the housing including a through passage and two through holes respectively intersecting the branch passages of the through passage branching off from the middle portion of the through passage, the two slide bars respectively including filtering portions communicatable with the through passage, the two slide bars being respectively inserted into the through holes of the housing in such a manner that they are liquid tight and can be reciprocated, molten materials from an extruding machine are guided to flow from the in-flow passage of the through passage of the housing through the filtering portions of the slide bars to the out-flow passage of the through passage of the housing, characterized in that there is formed a material discharge passage extending from the neighborhood of a point of intersection of at least one of the through holes of the housing with the through passage thereof and communicating with the outside, and the material discharge passage and the in-flow passage are allowed to communicate with each other by means of the in-flow portions of the through passage portions of the slide bars.

In the screen changer filtering method according to the invention, the through passage portions of the two slide bars and the through passage of the housing can be brought into communication with each other selectively and arbitrarily in any one of the three conditions including the first condition in which the through passage portions of the two slide bars are respectively in communication with the branch passages of the housing at the same time, a second condition in which only the through passage portion of one of the slide bars is in communication with the through passage of the housing, and a third condition in which one of the slide bars brings an in-flow-passage branched off from the through passage of the housing into communication with a material discharge passage allowing one of the through holes of the housing to communicate with the outside by means of the in-flow portion of the through passage portion thereof and, at the same time, the other slide bar shuts off the other branch passage of the housing through passage, or another third condition in which the two slide bars bring the in-flow passage of the through passage of the housing into communication with the material discharge passage, allowing the through holes of the housing to communicate with the outside by means of the in-flow portions of the through passage portions thereof, so that filtering of the molten materials, cleaning of the filtering portions and discharge of the molten materials to the outside can be carried out selectively and arbitrarily.

Also, in the screen changer according to the invention, there is formed a material discharge passage extending from the neighborhood of a point of intersection of at least one of the through holes of the housing with the through passage thereof and communicating with the outside, and the material discharge passage and the in-flow passage are allowed to communicate with each other by means of the in-flow portions of the through passage portions of the slide bars, so that, while using the through passage portions of the slide bars, the molten materials can be discharged outside of the housing without passing through the filtering portions thereof.

DETAILED DESCRIPTION OF PREFERRED EMBODIMENTS

Now, a description will be given below in detail of the preferred embodiments of a screen changer filtering method and a screen changer according to the invention, with reference to the accompanying drawings. Here, in the following description of the preferred embodiments of the invention, the same or equivalent parts are given the same designations as in the above-mentioned conventional examples.

Figure 1:
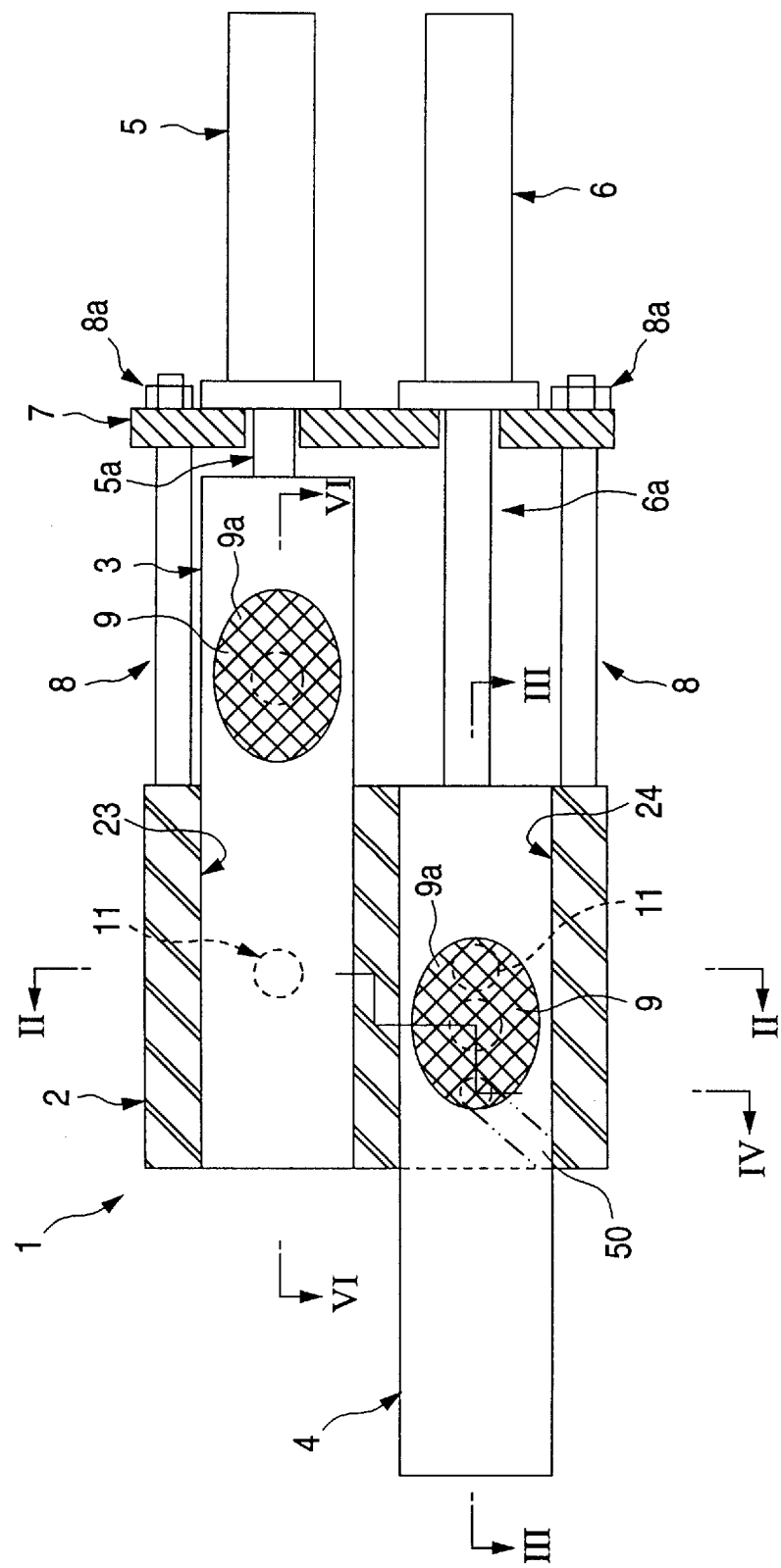
FIG. 1 is a partially sectional front view of a screen changer according to the invention, showing a molten material discharging state thereof.
Figure 2:
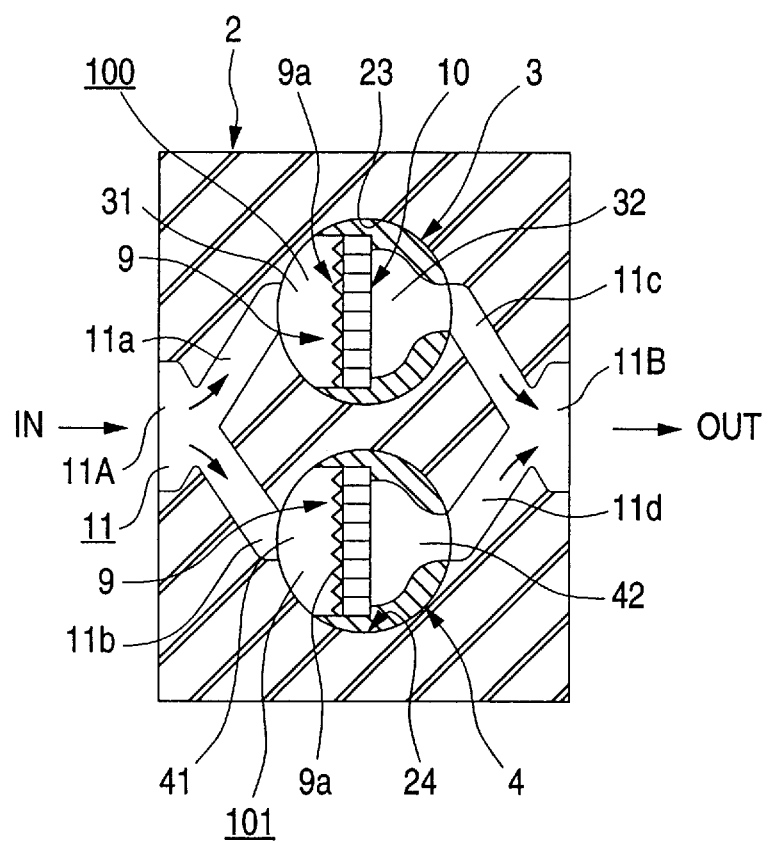
FIG. 2 is a section view taken along the line II—II in FIG. 1, showing the normal operation state of the screen changer.
Figure 3:
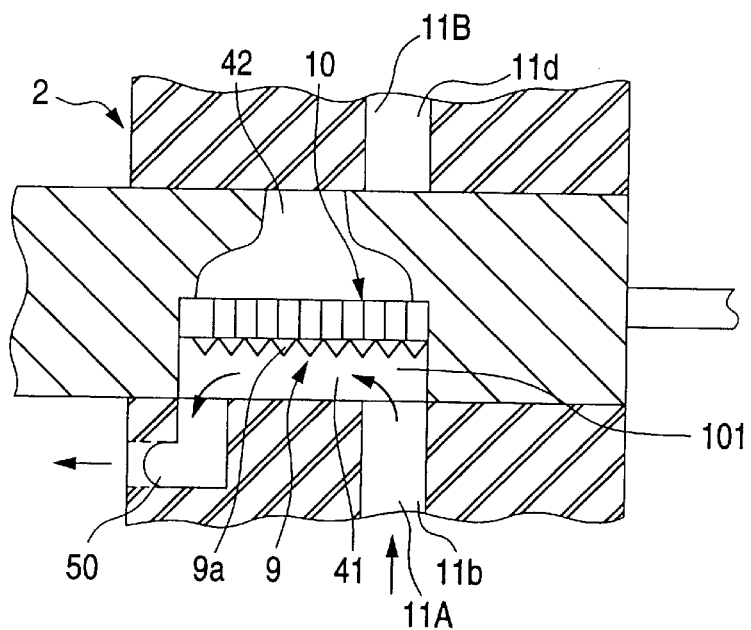
FIG. 3 is a section view taken along the line III—III in FIG. 1.
Figure 4:
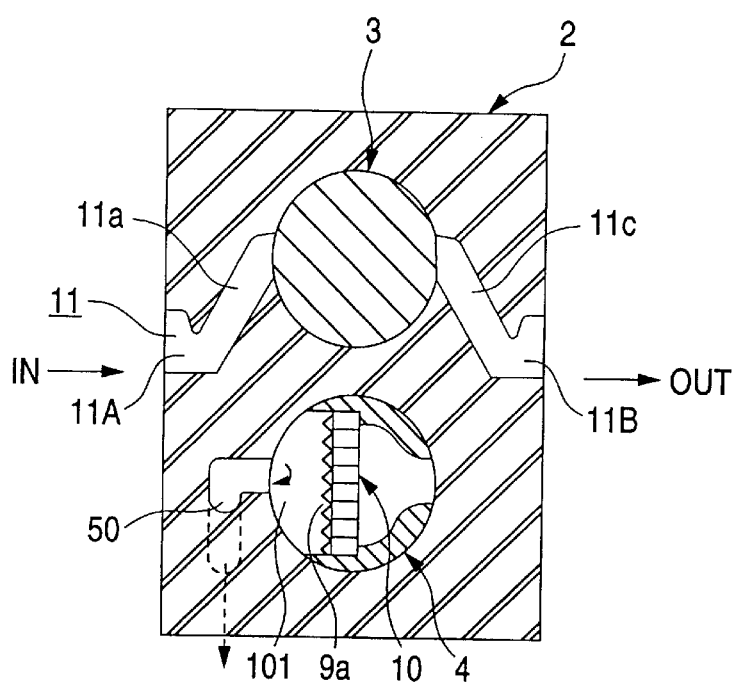
FIG. 4 is a section view taken along the line IV—IV in FIG. 1.
Figure 5:
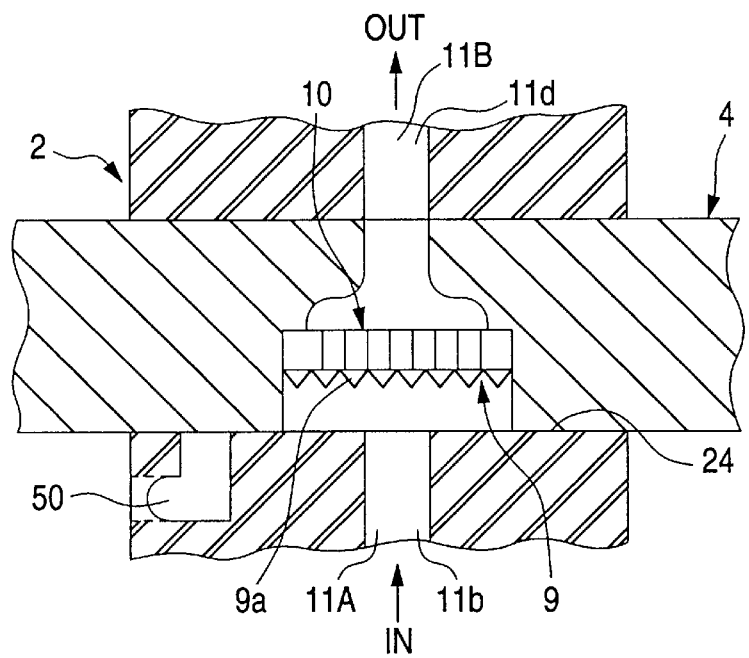
FIG. 5 is a section view, showing the normal operation state of FIG. 3.
Figure 6:
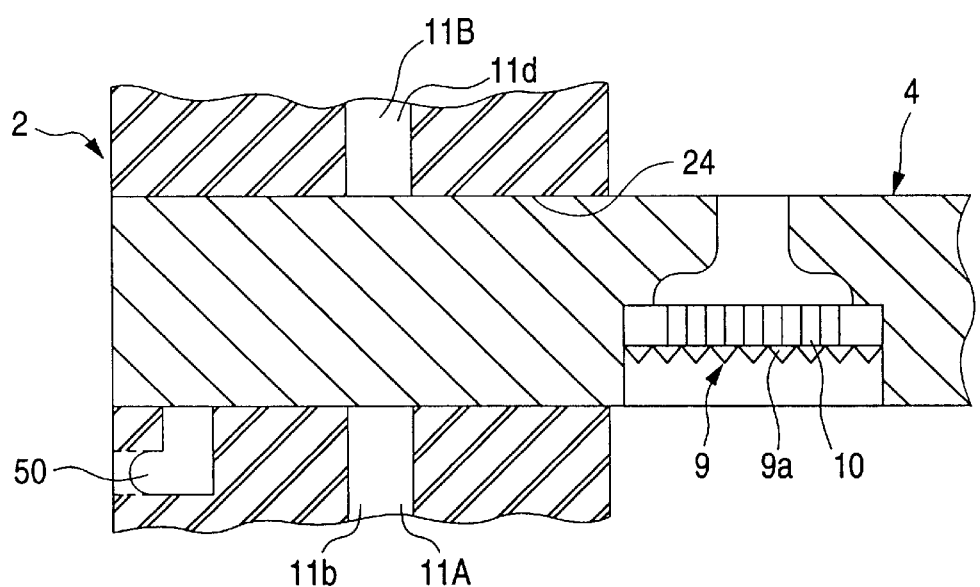
FIG. 6 is a section view taken along the line VI—VI in FIG. 1.

FIG. 1 is a partially sectional front view of a screen changer according to the invention, showing how the molten materials are discharged by the present screen changer, FIG. 2 is a section view taken along the line II—II shown in FIG. 1, showing the normal operation state of the screen changer, FIG. 3 is a section view taken along the line III—III in FIG. 1, FIG. 4 is a section view taken along the line IV—IV in FIG. 1, FIG. 5 is a section view, showing a normal operation state in FIG. 3, and FIG. 6 is a section view taken along the line VI—VI in FIG. 1.

Figure 7:
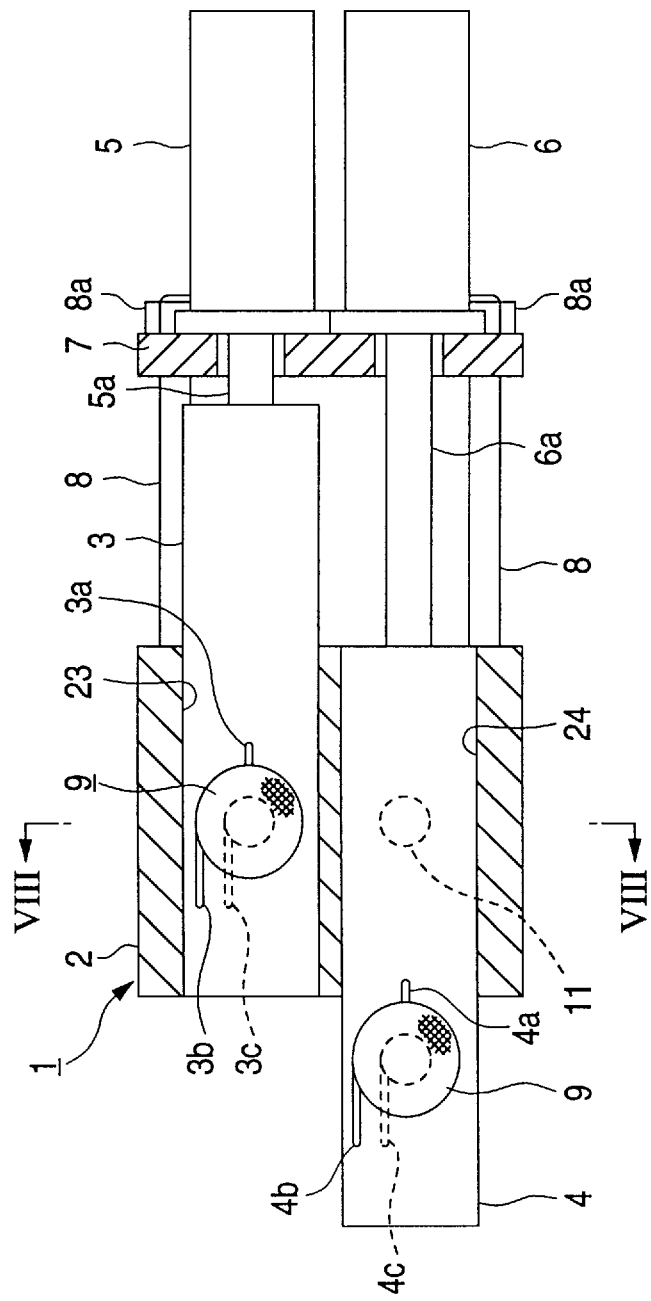
FIG. 7 is a partially sectional front view of a first structure of a conventional screen changer.
Figure 8:
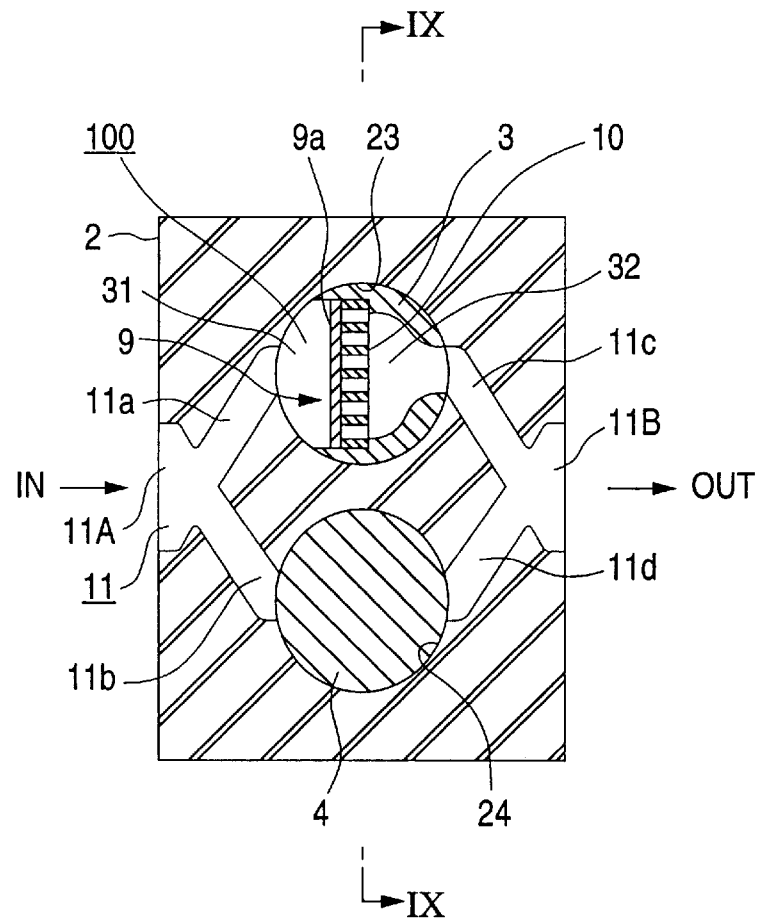
FIG. 8 is a section view taken along the line VIII—VIII in FIG. 7.
Figure 9:
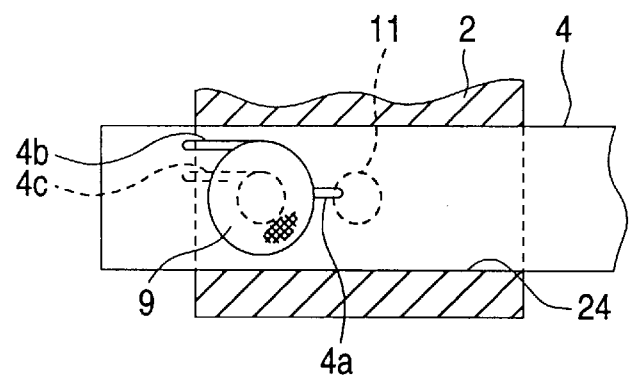
FIG. 9 is a partial view of a section taken along the line IX—IX in FIG. 8.
Figure 10:
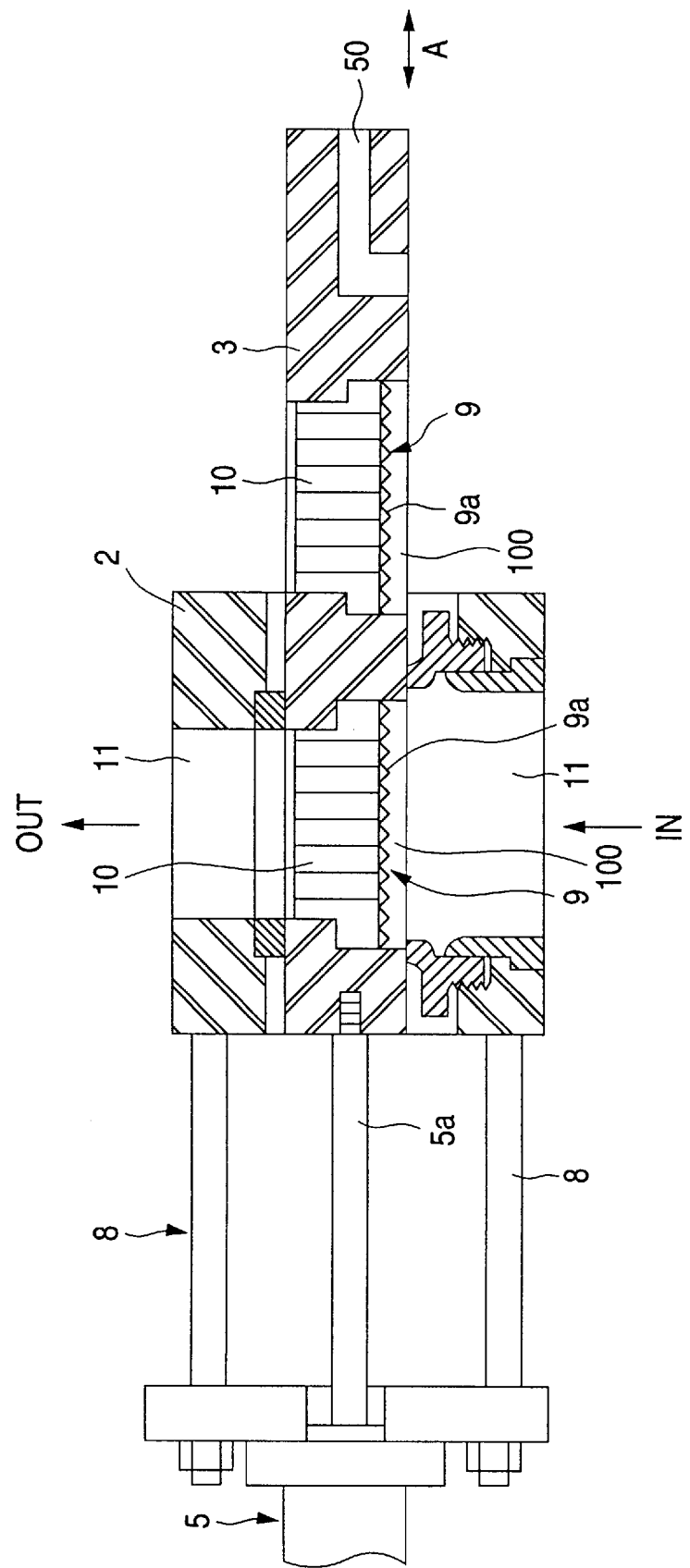
FIG. 10 is a section view of a second structure of a conventional screen changer.

Here, since the general structure of a screen changer according to the invention is substantially the same as the conventional structure shown in FIGS. 7 to 9, a structure almost similar to the FIG. 7 is also applied to the present invention as FIG. 1. That is, the screen changer 1 comprises a housing 2 including two parallel through holes 23, 24 each having a circular section taken along the direction at right angles to the axis thereof, two cylindrical slide bars 3, 4 respectively inserted into the through holes 23, 24 in such a manner that they are liquid tight and can be reciprocated, and two oil cylinders 5, 6 which are respectively fixed to the housing 2 through a plurality of tie bars 8, nuts 8a and mounting plates 7 and also which include piston rods 5a, 6a respectively connected to the slide bars 3, 4. The above sections of the through holes 23, 24 of the housing 2 and the slide bars 3, 4 with respect to the right angles to the axes thereof are not restricted to the circular shape but can also be other shapes such as a polygon including an ellipse or a rectangle.

In the housing 2, there is formed a through passage 11 which extends in a direction perpendicular to the through holes 23, 24. The through passage 11, on the entrance side IN thereof, includes an in-flow passage 11A which branches off into an upper in-flow passage 11a and a lower in-flow passage 11b and, on the exit side OUT thereof, includes an out-flow passage 11B into which an upper out-flow passage 11c and a lower out-flow passage 11d respectively continuing with the branched upper and lower in-flow passages 11a and 11b converge. The flow passages 11a–11d intersect the through holes 23, 24 and also communicate with them, respectively. In the respective slide bars 3, 4, there are formed through passage portions 100, 101, which respectively communicate with the through passage 11 and extend through the slide bars in the direction at right angles to the axes thereof, and filtering portions 9 which are respectively situated in the middle portions of the respective through passage portions 100, 101. The through passage portions 100, 101 respectively include upstream chambers 31, 41 and downstream chambers 32, 42 with the filtering portions 9 as the boundaries thereof, while each of the filtering portions 9 includes a screen 9a and a breaker plate 10.

In order that a large filtering area can be provided, that is, each of the screens 9a can provide a large plane area, the upstream chambers 31, 41 are respectively formed in such a manner that they have large opening sections. On the other hand, the downstream chambers 32, 42 are respectively formed in such a manner that the opening sections thereof are large after the breaker plates 10 but decrease smoothly in the downstream direction from the large opening sections thereof so as to be able to match the small opening sections of the out-flow passages 11c, 11d. Also, the through holes 23, 24 of the housing 2 are respectively formed so as to have sufficient lengths to seal up and shut off the filtering portions 9 and the through passage portions 100, 101 of the slide bars 3, 4, when the slide bars 3, 4 are reciprocated. That is, the thickness of the housing 2 extending from the through passage 11 to the side surface is set larger than the respective opening widths of the through passage portions 100, 101 of the slide bars 3, 4. In the neighborhood of the lower in-flow passage 11b in communication with the lower through hole 24 of the housing 2, there is provided a material discharge passage 50 which is formed in an L shape and extends from the lower through hole 24 and communicates with the outside surface of the housing 2. The material discharge passage 50 and the lower in-flow passage 11b are structured in such a manner that they allow the upstream chamber 41 of the lower slide bar 4 to communicate in part with the lower in-flow passage 11b. At the same time, when the downstream chamber 42 is shut off from the lower out-flow passage 11d, the two passages 50 and 11b are allowed to communicate with each other through the upstream chamber 41 of the through passage portion 101 of the lower slide bar 4.

The slide bars 3, 4 are structured in such a manner that they can be reciprocated by the oil pressure cylinders 5, 6 within the through holes 23, 24 of the housing 2 between a cleaning or replacement condition in which the filtering portions 9 are completely exposed outside the housing 2 and thus the screens 9a of the filtering portions 9 can be cleaned or replaced, as shown by the upper driver 3 in FIG. 1, and a communication condition in which the filtering portions 9 allow the lower in-flow passage 11b and the material discharge passage 50 to communicate with each other, as shown by the lower driver 4.

Next, description will be given below of the operation of the present screen changer. At first, in the initial stage of the operation of an extruding machine (not shown), the slide bars 3, 4, as shown in FIG. 1, are operated in such a manner that the filtering portion 9 and through passage portion 100 of the upper slide bar 3 are not in communication with the through passage 11 of the housing 2 and also that the filtering portion 9 and through passage portion 100 of the lower slide bar 4 are in communication with the lower in-flow passage 11b and material discharge passage 50 of the housing 2 but not in communication with the lower out-flow passage 11d.

In the above state, if the initial operation of the extruding machine (not shown) is carried out, then the molten materials extruded from the extruding machine, as shown in FIGS. 3 and 4, are moved from the lower in-flow passage 11b into the through passage portion 101 of the lower slide bar 4, while the molten materials are not passed through the filtering portion 9 but are passed through the upstream chamber 41 in front of the filtering portion 9 and are then guided into the material discharge passage 50, from which the molten materials are finally discharged outside the housing 2. Here, if the downstream chamber 42 of the through passage portion 101 is empty, then a small quantity, that is, a quantity necessary to fill up the empty downstream chamber 42, of the molten materials are allowed to pass through the filtering portion 9; and, if the downstream chamber 42 is filled with the molten material in the previous operation of the extruding machine, then the molten materials are not allowed to newly pass through the filtering portion 9. Therefore, in this state, impurities (mixtures), which are the residuals of deteriorated polymers or the like remaining in the extruding machine, are discharged outside together with the molten materials.

Next, after the molten materials containing the impurities are discharged, the extruding machine is put into its normal operation. Thus, if not only the upper slide bar 3 is moved from the state shown in FIG. 1 to the left to thereby bring the through passage portion 100 into communication with the upper in-flow passage 11a and upper out-flow passage 11c of the through passage 11 (as shown in FIG. 2) but also the lower slide bar 4 is moved from the state shown in FIG. 1 slightly to the right to thereby bring the through passage portion 101 into communication with the lower in-flow passage 11b and lower out-flow passage 11d of the through passage 11 (as shown in FIGS. 2 and 5), then the material discharge passage 50 is closed by the lower slide bar 4, which allows the molten materials to pass through the respective filtering portions 9.

Also, when cleaning or replacing the screen 9a of either of the filtering portions 9, as shown in FIGS. 6 and 1, for each of the slide bars 3, 4, that is, alternately, either of the through passage portions 100, 101 is shifted from the through passage 11 to be not in communication therewith and is then exposed completely outside the housing 2, so that the exposed screen 9a can be cleaned or replaced with a new screen. Here, provision of the material discharge passage 50 is not limited to the above case corresponding to the lower slide bar 4 but it can also be provided on the upper slide bar 3 side of the housing. Further, such material discharge passages 50 can also be formed in both of the slide bars 3, 4. However, the description of the concrete embodiments of such cases is omitted here.

Since the screen changer filtering method and a screen changer according to the invention are structured in the above-mentioned manner, there can be obtained the following effects:

That is, by discharging the molten materials in the early stage of the operation of the extruding machine through the material discharge passage formed in the housing, the mixtures such as the deteriorated polymers remaining in the extruding machine prior to the normal operation thereof can be removed simply and positively.

Also, since the material discharge passage is formed in the housing, the slide bars can be respectively structured such that they require only the filtering portions. That is, the slide bars can be simplified in structure, require small moving strokes, can be made compact, and do not require separate discharge devices, which makes it possible to shorten the whole length of the extruding machine.

Further, the flow state of the molten materials is not interrupted but can be gradually switched from the state thereof in which the molten materials are discharged through the material discharge passage, so that the molten materials can be made to flow into the filtering portions of the slide bars. This eliminates the possibility that the air can be mixed into the molten materials in the flow state switching operation as in the conventional structures, thereby being able to obtain an extrusion molded product of a high quality.

What is claimed is:

1. A screen changer comprising:

a housing including a through passage and a plurality of through holes, said through holes respectively intersecting branch passages of the through passage branching off from a middle portion of the through passage;

a plurality of slide bars respectively including filtering portions respectively adjoining the through passage, the slide bars being respectively inserted into the through holes of the housing in such a manner that they are liquid tight and can be reciprocated, wherein said screen changer allows molten materials to pass from in-flow passages of the through passage of the housing through said filtering portions of the slide bars to out-flow passages of the through passage of the housing, and a material discharge passage extending from proximal to a point of intersection of at least one of the through holes of the housing and the through passage of the housing, said material discharge passage communicating with the outside, wherein when said material discharge passage and said in-flow passages are brought into communication with each other by the in-flow portions of the through passage portions of the slide bars, said in-flow passages of the other of said through holes are prevented from communicating with the respective one of the filtering portions of the respective one of the slide bars.

2. A screen changer filtering method comprising the steps of:

passing molten materials from an extruding machine from an in-flow passage of a through passage of a housing to through passage portions and filtering portions of a plurality of slide bars to an out-flow passage of said through passage of said housing;

moving said slide bars to bring in-flow passages of said through passage of said housing into a first position which is in adjoinment with a material discharge passage formed to communicate through holes of said housing with the outside, through in-flow portions of said through passage portions, such that the molten materials flow through said material discharge passage and are prevented from flowing through said filtering portions to said out-flow passage of said through passage of said housing; and moving said slide bars to bring in-flow passages of said through passage of said housing into a second position which is in adjoinment with out-flow portions of said through passage portions, whereby said material discharge passage is closed and molten materials are allowed to pass through said filtering portions and through said out-flow passage of said through passage of said housing.

* * * * *